US008349108B2

(12) United States Patent
Schneider

(10) Patent No.: US 8,349,108 B2

(45) Date of Patent: Jan. 8, 2013

(54) METHOD AND MACHINE FOR PRODUCING RESEALABLE BAGS

(75) Inventor: Jakob Schneider, Niederkassel (DE)

(73) Assignee: Lemo Maschinenbau GmbH, Niederkassel-Mondorf (DE)

( * ) Notice: Subject to any disclaimer, the term of this patent is extended or adjusted under 35 U.S.C. 154(b) by 1194 days.

(21) Appl. No.: 10/589,408

(22) PCT Filed: Feb. 5, 2005

(86) PCT No.: PCT/EP2005/001186

§ 371 (c)(1),
(2), (4) Date: Apr. 3, 2008

(87) PCT Pub. No.: WO2005/077648

PCT Pub. Date: Aug. 25, 2005

(65) Prior Publication Data

US 2012/0037308 A1 Feb. 16, 2012

(30) Foreign Application Priority Data

Feb. 12, 2004 (DE) ........................ 10 2004 006 840

(51) Int. Cl.
*B32B 37/00* (2006.01)

(52) U.S. Cl. ............ 156/66; 156/217; 156/252; 53/551; 383/43

(58) Field of Classification Search .................... 156/66, 156/250, 251, 253, 269, 270, 301, 302, 303, 156/324, 217, 252; 53/412, 451, 551, 552, 53/133.4, 139.2; 493/213, 394, 927; 383/42, 383/43

See application file for complete search history.

(56) References Cited

U.S. PATENT DOCUMENTS

| | | | | |
|---|---|---|---|---|
| 6,327,837 | B1 * | 12/2001 | Van Erden | 53/412 |
| 6,652,436 | B1 * | 11/2003 | Yeager et al. | 493/213 |
| 2002/0052281 | A1 * | 5/2002 | Van Erden | 493/394 |

* cited by examiner

*Primary Examiner* — James Sells

(74) *Attorney, Agent, or Firm* — Andrew Wilford

(57) ABSTRACT

The invention relates to a method for the automatic production of bags (9) that are equipped with a sealing device (3). Said method comprises the following steps: provision (P) of at least one web of plastic film (1), provision of a sealing device (3), fixing of the sealing device (3) to the web of plastic film (1) and welding (7, 8) of the web of plastic film (1) to form bags (9). According to said method, the plastic-film web (1) is perforated (2) at a distance from its edge (5) prior to the provision (P) of the sealing device (3) and the complementary sealing profile (3) is fixed to the web of plastic film (1) directly over the perforation. The bag (9) is then formed and welded by means of at least one longitudinal (7) and/or transversal weld (8).

10 Claims, 2 Drawing Sheets

METHOD AND MACHINE FOR PRODUCING RESEALABLE BAGS

CROSS REFERENCE TO RELATED APPLICATIONS

This application is the US-national stage of PCT application PCT/EP2005/001180, filed 5 Feb. 2005, published 25 Aug. 2005 as WO 2005/077648, and claiming the priority of German patent application 102004006840.2 itself filed 12 Feb. 2004.

FIELD OF THE INVENTION

The invention relates to a method for the automatic production of bags each having a seal by using the following production steps: feeding of at least one plastic film in order to create the side walls, feeding of a seal with complementary sealing profiles, attaching of the seal to the plastic film, and welding the plastic film in order to form the bags. Furthermore, the invention relates to a machine for the automatic production of bags having seals.

BACKGROUND OF THE INVENTION

Bags with sealing profiles are used wherever frequent opening and closing is required. Therefore it is conceivable, for example, to store food such as chips or cereals in this type of bag. In order to further simplify the handling of such bags, a slide may additionally be provided on the complementary sealing profiles for opening and/or closing the bag.

A bag that is provided with a reclosable seal is known from U.S. Pat. No. 6,308,498 B1. Here, a bag is described where the reclosable seal is welded to the inner bag side walls and the bag walls completely enclose the reclosable seal. The reclosable seal is formed by complementary sealing profiles and a perforated connecting piece linking the sealing profiles. When the bag is torn open, first the perforation line, meaning the connection between the two profiles, is detached, then the two sealing profiles are separated and finally the two connected side pieces are torn apart on one side. In order to close the bag again, the two complementary sealing profiles are pressed into one another again.

In order to avoid having to work with pre-manufactured bags, so called form, fill and sealing machines (FFS) were developed. A machine of this kind is described in the European patent application EP 1 099 636 A2. In form, fill and sealing machines of this type, the plastic film that is used to make the bag is directly rolled off a reel and fed into the bag production machine. In the embodiment described, the plastic film is first formed, meaning folded around its centerline, and subsequently a reclosable seal is welded to the fold or inside the open foil panel. After transverse welding, the bag is open on one side and may be filled. Subsequent to filling, the bag is sealed by another longitudinal weld. For opening and closing of the bag, a slide is mounted on sealing elements.

Since the filling and production of the bag is performed horizontally, these machines are called horizontal form, fill and sealing machines.

One example of a vertical FFS machine is described in EP 0 994 772 B1. A method for the automatic production of bags with matching closure profiles is described. The plastic film unwound from the reel is guided over a forming shoulder and subsequently welded to a closure assembly consisting of sealing profiles and a closing element. Directly following the forming and welding of the closure assembly and the creation of a transverse weld, the bag is filled with product by means of a filling chute. The closure assembly for resealing the finished bag is fed as a separate component and first has to be torn open during initial opening of the bag, since the closure assembly is designed closed facing the inside of the bag.

OBJECT OF THE INVENTION

The invention is based on the object of developing a method for the production of a reclosable bag wherein a bag may be manufactured inexpensively and in a simple design that is reclosable and that furthermore guarantees safe storage of the contained product. In addition, a machine is supposed to be developed to perform the task to be achieved.

SUMMARY OF THE INVENTION

From a procedural point of view, the task according to the invention is achieved in that before feeding the seal a perforation line is formed in a strip of the plastic film at a spacing from the panel edge, that the complementary sealing profile is attached immediately above the perforation line of the plastic film and that subsequently the bag is formed, and finally the bag is created by at least one longitudinal and/or at least one transverse weld. By means of the procedural solution, the possibility is now created of manufacturing the product with simple design means and in a cost-effective way. By so doing, the perforation line is made in the plastic film immediately following the unwinding of the plastic film from the reel. Subsequently, the complementary sealing profile is attached to the plastic film directly at the perforation line. This is done by applying the sealing profile to the plastic film in such way that the center of the sealing profile, meaning the opening of the sealing profile, is aligned with the center of the perforation line. One advantage according to the invention is very simple and therefore cost-effective sealing profiles can be used.

The machine that solves the task according to the invention for the automatic production of bags with seals is characterized in that it has the following characteristics:

- means suitable for guiding a plastic film, wherein at least one plastic film forms the walls of the bag,
- means for perforating of the plastic film,
- means for the continuous feeding, separation and attachment of the seal to the plastic film and
- means for forming, filling and welding the plastic film.

By using commonly known means, meaning devices and machine components, cost-effective production of the machine is guaranteed.

BRIEF DESCRIPTION OF THE DRAWING

In the following the invention will be explained in more details with reference to the drawings. Therein.

DETAILED DESCRIPTION

Figure 1:
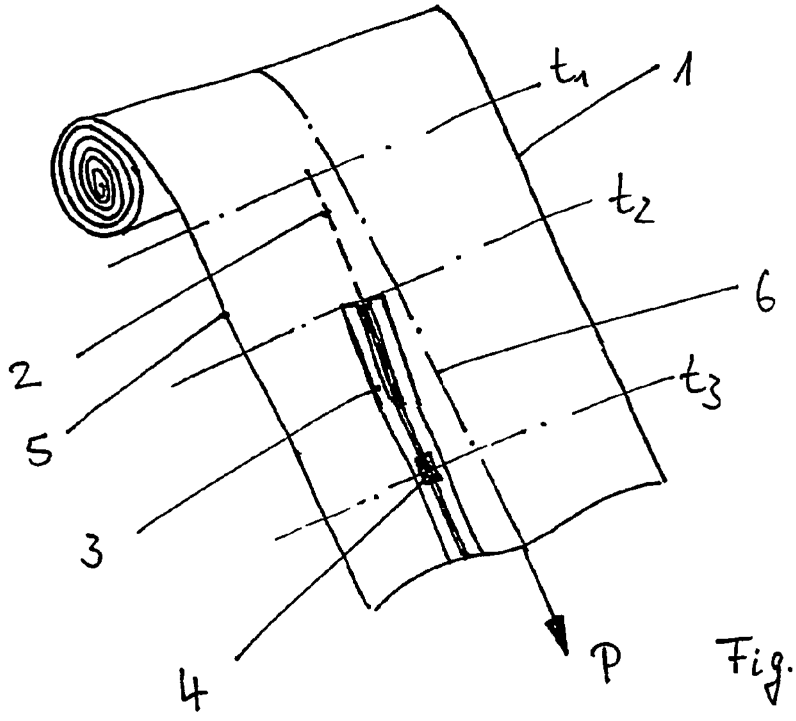
FIG. 1 is a plastic film that has been unwound from a reel, with a perforation line and attached seal.
Figure 2:
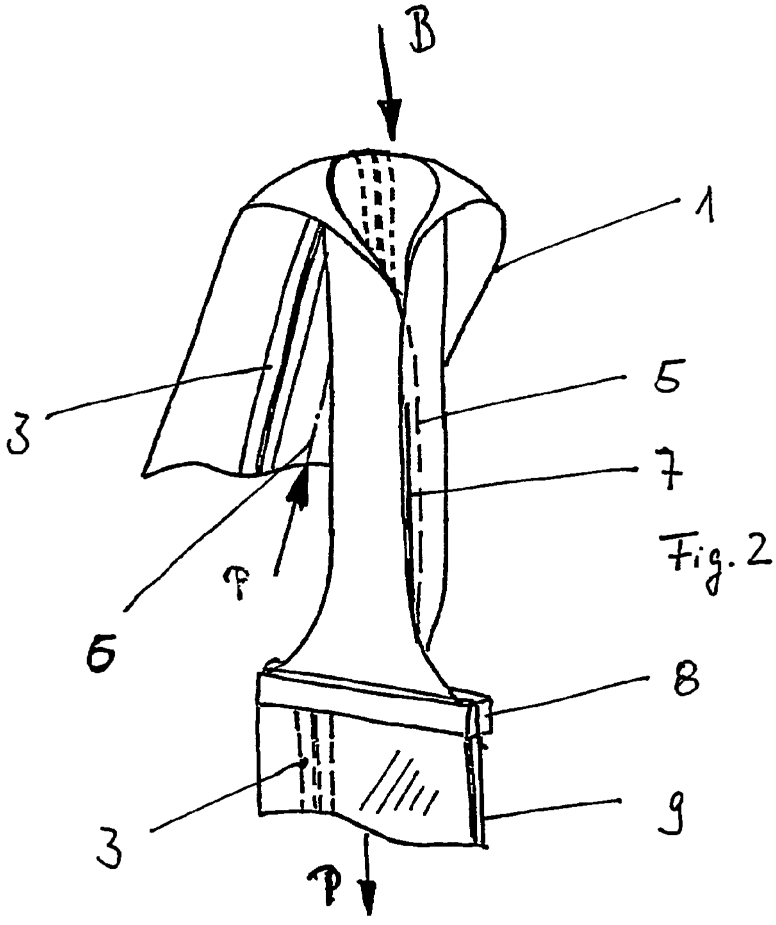
FIG. 2 shows the movement of the plastic film during forming and subsequent sealing.

It shall be expressly stressed that the figures only represent exemplary embodiments of the invention. In FIG. 1 only one strip of plastic film is shown. However, the invention is not limited to the use of only one plastic film, as several may be used. FIG. 2 shows a vertical production method for plastic bags. However, a horizontal production method or a comparable method for production of the bags may be used as well.

FIG. 1 shows a wound plastic film strip 1 that is unwound for processing in the direction of the arrow P. According to the invention, a perforation line 2 is first cut into the unwound plastic film strip 1. In a subsequent step, complementary sealing profiles 3 are attached to the plastic film strip 1. In the following step, a slide 4 is mounted on the sealing profiles 3 for each of the bags to be manufactured.

Following unwinding of the plastic film strip 1, at time t1 the perforation line 2 is cut in the plastic film strip 1. Here the perforation line 2 is made in the plastic film strip 1 at a spacing from an edge 5. However, the perforation line 2 may also be positioned exactly in a centerline 6 of the plastic film strip 1. According to the invention, however, the perforation line 2 has to be spaced from the edge 5 of the plastic film strip 1 in such way that the application of the sealing profiles does not impair the welding of the edge 5 of the plastic film strip 1. According to the invention it is also conceivable to form the perforation line 2 in the plastic film strip 1 transversely to the panel longitudinal travel direction F. Accordingly, the sealing profiles 3 then also have to be fed transversely to the panel travel direction P of the plastic film strip 1.

At time t2, the sealing profiles 3 are attached to the surface of the plastic film strip 1 directly above the perforation line 2. The sealing profiles 3 are applied to the plastic film strip 1 above the perforation line 2 such that during separation of the sealing profile 3 the opening of the sealing profile 3 is located directly in the center of the perforation line 2. Various geometric forms may be used as the sealing profiles 3, conventionally such profiles are also called male and female profiles. These however are commonly known and do not have to be explained here in detail. The sealing profiles 3 are attached to the surface of the plastic film strip 1. The sealing profiles 3 may be welded or glued on and can be connected to the plastic film strip 1 permanently. The selection of the method for attaching the sealing profiles 3 is done as a function of the material of plastic film strip 1 and the sealing profile 3 that is typically made of plastic.

Alternatively, at a time t3, a slide 4 may be mounted to the sealing profile 3. The slides 4 are mounted to the sealing profile 3 in a rhythm, that is at the cycle of the bags being manufactured. Here too it is true that standard slides 4 may be used that do not require detailed description.

Following the application of the seal 3, 4 and the formation of the perforation line 2, the plastic film strip 1 is passed downstream into a shaping tool in the direction of the arrow P, as is shown in FIG. 2. In the example of the embodiment shown in FIG. 2, the plastic film strip 1 is guided over a shaping shoulder and formed into a tube. The shaping shoulder is not shown, only the course of the plastic film strip 1 stretched over the shaping shoulder. In this particular embodiment, the sealing profiles 3 are applied slightly offset from the centerline 6 of the plastic film strip 1. Following the shaping of the plastic film strip 1, the edges 5 are positioned above each other and may be welded together. Line 7 shows by way of example the position of a longitudinal weld 7 for forming a plastic tube. Following the longitudinal welding, a transverse weld may now be applied by means of weld jaws 8. Since as a result of the longitudinal welding 7 and transverse welding 8 a bag that is open on top is created, filling of the bag open on top may now take place in the direction of arrow B. By means of stepwise feeding of the plastic film strip 1 and renewed transverse welding 8, a filled plastic bag 9 is created. As may be seen in FIG. 2 as well as in FIG. 3, the sealing profile 3 is located outside the centerline 6 of the folded plastic film strip 1.

Figure 3:
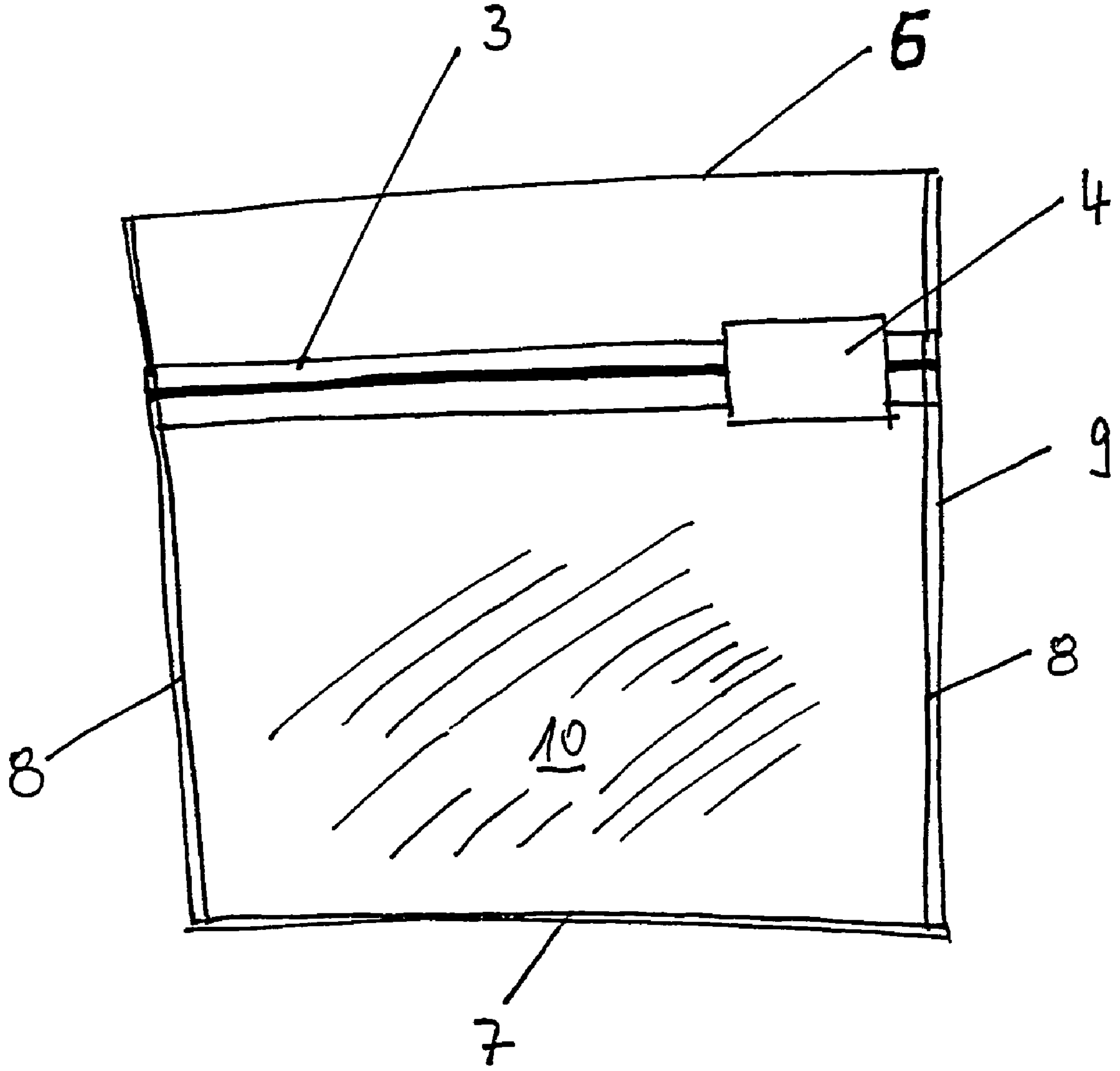
FIG. 3 shows a bag manufactured with the method according to the invention.

FIG. 3 represents a bag 9 manufactured with the method according to the invention. The bag 9 is already filled with the product 10. This bag 9 that was manufactured with the production steps described above with two transverse welds 8 and one longitudinal weld 7. The film strip 1 was folded in its centerline 6 and therefore only has three welds. However, one needs to keep in mind that the sealing profile 3 may also be welded. For opening the completely finished bag 9, the closure 3 is now opened by means of the slide 4 and the perforation line 2 located below the sealing profile 3 is exposed. The perforation line 2 may now be punctured or torn and the product 10 may be removed. Following removal of the product 10 or a portion of the product 10, the bag 9 may be resealed by means of the slide 4 and the sealing profiles 3.

With respect to the machine according to the invention for the automatic production of bags 9 with a seal 3 one has to consider that the formation of the perforation line 2 is done prior to the application of the seal 3 and shaping. According to the invention, by means of the direct formation of the perforation line 2 in the plastic film strip 1 a complicated and therefore expensive sealing assembly becomes obsolete. However, since conventional standardized sealing profiles 3 are used, the conventional feeding devices for the sealing profiles 3 may be used that positively influence equipment costs.

The invention claimed is:

1. A method of making a reclosable bag, the method comprising the steps of sequentially:

- unwinding and advancing a strip of plastic film in a travel direction parallel to edges of the strip of film;
- forming in the film at a spacing from one of the edges and from a centerline of the strip a continuous perforation line extending in the direction;
- fixing a pair of interfittable seal elements to the film directly at the perforation line with the perforation line aligned under a center of the pair of seal elements and the seal elements extending directly from the one edge to the centerline of the strip;
- folding the strip at the centerline and juxtaposing the edges of the strip; and
- transversely welding the strip together at a transverse seam at a leading edge of the seal elements and longitudinally sealing the edges of the film together at a longitudinal seam to form the strip into a bag open upstream in the travel direction.

2. The bag-making method defined in claim 1 wherein the seal elements are continuously applied to the film.

3. The bag-making method defined in claim 2 wherein the film is folded such that a portion of the film having the perforation forms a front side of the bag and another portion of the film forms a back side of the bag.

4. The bag-making method defined in claim 1 wherein the seal elements extend a full width of the bag between the transverse seam and the fold at the centerline.

5. The bag-making method defined in claim 1, further comprising the step of

- fitting a slider to the seal elements.

6. The bag-making method defined in claim 1, further comprising the step after welding all but one of the seams of:

- filling the bag.

7. The bag-making method defined in claim 1 wherein the seal elements are fixed to the film by welding.

8. The bag-making method defined in claim 1 wherein the seal elements are adhesively fixed to the film.

9. A resealable bag made by the method of claim 5 and comprising:

substantially identical rectangular and congruent front and rear film panels joined together at parallel and spaced longitudinal edges and parallel and spaced transverse edges bridging the longitudinal edges, the front panel being formed with a longitudinally extending perforation line extending a full longitudinal distance between the transverse edges;

a pair of matable seal elements fixed to an outer face of the front panel flanking the perforation line and also extending a full longitudinal distance between the transverse edges, the seal elements being separable generally at the line; and a slider shiftable along the elements to mate them together and to separate them.

10. The bag-making method defined in claim 1, further comprising the steps of:

filling the bag after formation of the longitudinal and transverse seams; and transversely seaming the film together at a downstream end of the sealing elements.

* * * * *